July 31, 1928.
A. H. NEILSON
SWIVEL ROPE SOCKET
Filed June 27, 1927
1,678,706
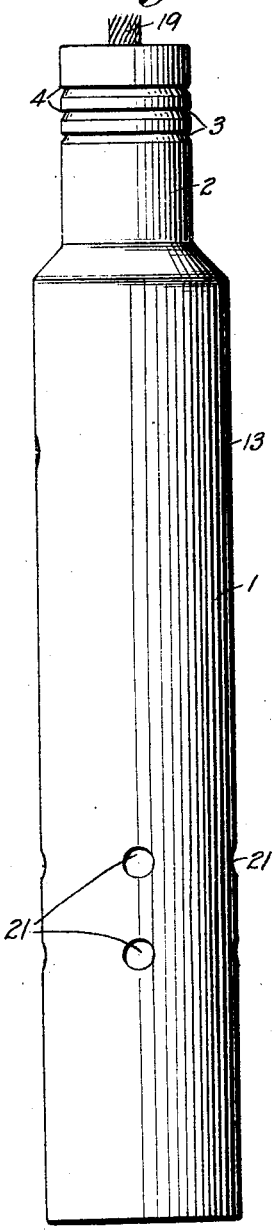
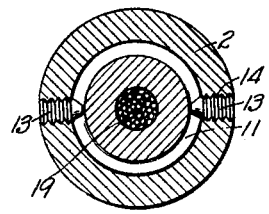
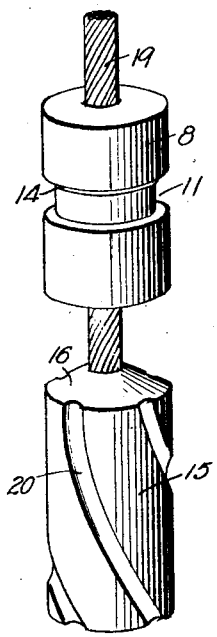
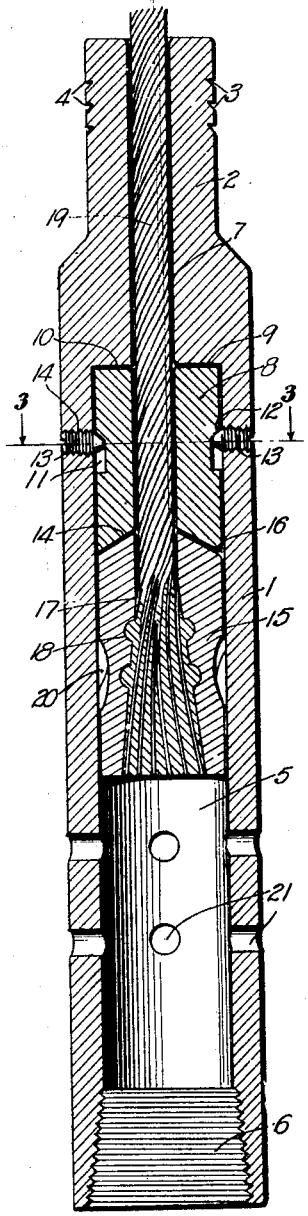
INVENTOR
Albert H. Neilson
BY
ATTORNEY Patented July 31, 1928.

1,678,706

UNITED STATES PATENT OFFICE.

ALBERT H. NEILSON, OF TULSA, OKLAHOMA.

SWIVEL ROPE SOCKET.

Application filed June 27, 1927. Serial No. 201,856.

My invention relates to rope sockets and more particularly to a device of that character for connecting drilling tools with a suspending rope or cable so that the tools may swivel during the drilling operation and thereby avoid damage of the rope, or severance thereof at the point of connection with the tools; the principal object of the invention being to extend the life of the socket by providing for renewal of parts subject to wear.

In accomplishing this and other objects of the invention I have provided improved details of structure, the preferred forms of which are illustrated in the accompanying drawings, wherein:

Fig. 1 is an elevation of a swivel rope socket constructed in accordance with my invention.

Fig. 2 is a central, longitudinal section of the same.

Fig. 3 is a cross section on the line 3—3, Fig. 2.

Fig. 4 is an enlarged detail perspective view of the rope anchor block and bushing, illustrating their relation to the suspending cable or rope.

Referring more in detail to the drawings:

1 designates a cylindrical body having a restricted shank 2 at its upper end provided with annular grooves 3 forming downwardly facing teeth 4 for application of a fishing tool thereto in case of loss of the socket in a well.

Extending throughout the greater portion of the length of the cylindrical body is a socket 5 circular in cross section and terminating in a flared mouth 6 provided with screw threads for the attachment of the socket to a drilling tool in accordance with common practice.

Opening from the face of the socket 5 and extending centrally through the shank 2 is a rope channel 7. Located within the base of the socket 5 is a bushing 8 of a diameter to fit snugly within the socket, although freely rotatable therein and having a flat face 9 abutting against the flat face 10 forming the base of the socket. The outer wall of the bushing 8 is provided with an annular groove 11 having a beveled upper edge 12 adapted to fit the tapered ends of set screws 13, which are carried in apertures 14 in the body member 2 and are of such length that when the tapered ends are located within the bushing grooves, as illustrated in Figs. 2 and 3, the heads of the screws are located wholly within the apertures and do not project beyond the wall of the body to engage the casing or any object which might deform the screws and interfere with their removal from the socket body. The bushing channel registers with the rope channel 7 in the socket body and shank 2, and terminates at its lower end in a concave seat 14.

15 designates an anchor block also circular in cross section and of a diameter to swivel in the socket 5 without lost motion and having a convex outer face 16 adapted to seat within the concave seat 14 of the bushing 8. A channel 17 in the anchor block registers with the bushing channel at the upper end of the block and tapers outwardly toward the opposite end of the block; being provided in its flared portion with annular grooves 18 for receiving Babbitt or like metal, whereby the splayed end of the suspending cable 19 is anchored in the block.

In order to prevent settling of sand or other foreign matter between the surface of the anchor block and the wall of the socket, I provide the block with longitudinal, spiral grooves 20 extending from end to end of the block and through which such foreign matter may be delivered into the portion of the socket beneath the block when the device is in use.

21 designates apertures in the socket body near its lower end through which sand admitted to the socket through the cable channel may escape into the well.

In assembling a socket, having its elements constructed as described, the suspending cable is extended through the channel in the shank end of the socket body and through the socket chamber. The bushing and anchor blocks are threaded onto the cable and the end of the cable splayed and anchored to the block with Babbit metal or the like poured into flared end of the block to seat about the strands of the cable and within the anchor groove 18.

With the parts so assembled, the socket is dropped over the bushing and anchor block until the bushing seats with its flat end against the flat face of the socket and the concavo-convex faces at the ends of the bushing and anchor block abut. The bushing is then anchored in the socket by means of the set screws, and a drilling tool such as a set of jars, is attached to the socket and let into the well by unreeling of the suspending cable.

The tools are then operated in the usual manner, and when turning in the well, swivel the socket body and the bushing on the anchor block; such swiveling action preventing twisting of the rope or shearing of the rope at its point of attachment to the socket. As the swiveling action tends to grind the abutting faces of the bushing and base of the socket or the concavo-convex faces of the bushing and anchor block, it is desirable to construct the bushing of a slightly softer material than the socket body and anchor block in order that the wear may be on the bushing, so that when the wear has reached a certain degree, the worn bushing may be replaced with a new one. Should the face of the socket become worn to a degree which will render the shank liable to breakage, it may be built up with new metal and should the anchor block wear, it may be replaced on the end of the rope.

It is apparent that with a socket constructed in accordance with my invention, the body, which constitutes the element of greatest cost, may remain in service for an indefinite period, and worn bushings readily replaced at slight cost. By providing the groove in the anchor slot, sand and other foreign matter is not only permitted to escape by gravity, from between the contacting surfaces but is forced out by the swiveling action of the block in the socket, thereby avoiding locking of the block in the socket or any destructive wear on the block due to the grinding action of the sand.

What I claim and desire to secure by Letters Patent is:

1. A device of the character described including a body having a socket opening through one end thereof and having a rope channel leading from the base of the socket, a rope anchor block in the socket and a bushing interposed between the anchor block and the base of the socket with its upper bearing face terminating flush with the base of the socket.

2. A device of the character described including a body having a socket opening through one end thereof and having a rope channel leading from the base of the socket, a rope anchor block in the socket, a removable bushing interposed between the anchor block and the base of the socket, and means for anchoring the bushing to said body.

3. A device of the character described including a body having a longitudinal socket opening through one end thereof and having a channel leading from the base of said socket, an anchor block loosely mounted in said socket, and a bushing interposed between the anchor block and the base of the socket, the abutting faces of the block and bushing being respectively concavo-convex and the upper bearing face of the bushing terminating flush with the base of the socket.

4. A device of the character described including a body having a longitudinal socket opening through one end thereof and having a channel leading from the base of said socket, an anchor block loosely mounted in said socket, and a bushing interposed between the anchor block and the base of the socket, the outer face of the anchor block being grooved longitudinally for the purpose set forth.

5. A device of the character described including a body having a longitudinal socket opening through one end thereof and having a channel leading from the base of said socket, an anchor block loosely mounted in said socket, and a bushing interposed between the anchor block and the base of the socket, the anchor block having spiral grooves in its outer face.

6. A device of the character described including a body having a longitudinal socket opening through one end thereof and having a channel leading from the base of said socket, an anchor block loosely mounted in said socket, a bushing removably mounted between the anchor block and base of the socket and having an annular groove in its outer face, and set screws projected through said body into said groove.

7. In combination with a body having a shank at one end, a socket opening through its opposite end, a channel leading through the shank from the base of the socket, a bushing removably seated in the base of the socket and having a channel registering with the shank channel, an anchor block swivelly mounted in the socket and against the bushing, the anchor block having a channel registering at its inner end with the bushing channel and flared at its outer end, and a rope extending through said channels and having a splayed portion anchored in the flared portion of the block channel.

In testimony whereof I affix my signature.

ALBERT H. NEILSON.